United States Patent [19]

Boros et al.

[11] Patent Number: 4,795,125

[45] Date of Patent: Jan. 3, 1989

[54] MOLD OR DIE ASSEMBLY

[75] Inventors: György Boros; Róbert Gulácsy; György László; Pál Narancsik, all of Budapest, Hungary

[73] Assignee: Központi Váltó-es Hitelbank Rt., Innovációs Alap, Hungary

[21] Appl. No.: 906,425

[22] Filed: Sep. 12, 1986

Related U.S. Application Data

[63] Continuation-in-part of Ser. No. 678,555, Nov. 20, 1984, abandoned.

[30] Foreign Application Priority Data

Mar. 25, 1983 [HU] Hungary .................. 1022/83

[51] Int. Cl.[4] ............ B29C 33/02; B29C 45/32; B29C 45/40; B29C 45/72
[52] U.S. Cl. .................................. 249/78; 249/81; 425/190; 425/195; 425/547; 425/548; 425/588; 425/384; 425/407
[58] Field of Search ............ 249/78, 79, 81, 80, 249/135; 425/547, DIG. 13, 548, 549, 384, 407, 526, 588, 193, 195

[56] References Cited

U.S. PATENT DOCUMENTS

| T949,004 | 8/1976 | Delaire et al. | 425/526 |
|---|---|---|---|
| 1,895,135 | 1/1933 | Rohn | 249/79 |
| 3,932,085 | 1/1976 | Horbach | 425/195 |
| 4,239,471 | 12/1980 | Swaroop | 249/81 |
| 4,416,604 | 11/1983 | Bender et al. | 425/190 |
| 4,473,346 | 9/1984 | Hehl | 425/183 |
| 4,508,309 | 4/1985 | Brown | 249/81 |
| 4,557,685 | 12/1985 | Gellert | 249/78 |
| 4,586,690 | 5/1986 | Hartel et al. | 249/78 |

FOREIGN PATENT DOCUMENTS

| 1546187 | 12/1966 | France . | |
|---|---|---|---|
| 2057196 | 5/1971 | France | 425/190 |
| 0201636 | 12/1982 | Japan | 425/190 |

OTHER PUBLICATIONS

Randolph et al, Plastics Engineering Handbook, Reinhold, N.Y. (1960) pp. 439-441.
Catalogue Sheets (DME and HASCO).
D1 K. Stoeckhert: "Werkzeugbau fur die Kunststoff-Verarbeitung" 1979 Carl Hauser Verlga Munchen, Wien, pp. 429 to 437.

Primary Examiner—Willard E. Hoag

[57] ABSTRACT

For manufacturing articles of plastics, rubber or any other material a mold or die assembly comprising a mold or die base assembled from repetitive modular standard elements consisting of substantially "ready to use" interchangeable base plates is provided by the invention.

The base plates are prefabricated by high-precision castings or galvanoplastics or any other similar high-precisious non-cutting method of manufacture.

At least two of such base plates are, as mold or die plates, provided with a pre-determined number and arrangement of finished to sized, prefabricated cylindrical bores or piercings of any non-circular, mainly polygonal cross-section. Each of said bores or piercings is capable of fittingly receiving an interchangeable mold or die insert carrying the individually designed (negative) mold or die cavity surface for forming the particular article(s) to be manufactured. In said mold or die inserts, suitable hollow spaces or passages for a suitable means for tempering the inserts are also provided for, preferably by prefabrication.

11 Claims, 11 Drawing Sheets

MOLD OR DIE ASSEMBLY

This is a continuation-in-part application of U.S. Ser. No. 678,555 filed Nov. 20, 1984 now abandoned.

The present invention relates to the art of manufacturing articles of plastics, rubber or any other non-metallic or metallic material by molding, die casting, hot or cold stamping and the like.

The main object of the invention is to reduce the cost of mold or die equipment by reducing the number of different parts required.

Designing and constructing mold or die assemblies by making use of mold or die bases consisting of standard modular base plates provided, especially along their peripheral areas, with prefabricated holes for receiving also standardized guiding and fastening component parts such as leader pins, guide and pilot pins, screws, their bushings and nuts etc. has been known in the art concerned for quite a long time. Several well-known leading manufacturers, e.g. DME EUROPE of Belgium or HASCO of Western Germany, among others, have been marketing mold kits available in a complete range of standard mold bases including interchangeable drilled plates suitable for being used as prefabs for clamping plates, support plates, mold or die plates, knock out pin actuators or retainers etc., designed and constructed in accordance with their individual, particular standard system, respectively. By making use of such kits of standard modular base plates, cost and labour demand of mold or die assemblies could be reduced considerably. Certain limitations and drawbacks however, are still inherent with all such known mold or die base systems. First of all, the interchangeable drilled base plates are made of solid blocks by machining all sides and surfaces thereof so as to obtain the required shape and size. All such base plates are made of high quality steel which, in many applications, has proved to be a waste of material and thus, resulting in unnecessary high cost. Shaping the individual mold or die cavity surfaces that would serve as negatives for forming the articles to be manufactured is still very labour insensive and time consuming calling for highly skilled work. All hollow spaces and passages for housing the often necessary tempering means or for conducting any suitable tempering medium such as water, oil, steam etc. can be machined by drilling long bores which, quite naturally, cannot closely follow the shape of the article to be made. As a result of this, heat transfer and distribution towards the article and within the base plates are non-uniform whereby, in many cases, stresses in both, the product and the die or mold plates are not avoidable. The above listed and other disadvantages and drawbacks of the known prior art mold or die bases are to be eliminated by making use of the present invention which provides an improved and novel technique for designing and constructing mold or die assemblies. According to the invention, a mold or die assembly comprising a mold or die base assembled from repetitive modular standard elements is provided, wherein said modular standard elements consist of more "ready to use" interchangeable base plates that are prefabricated by high-precision casting or galvanoplastics or any other similar high-precisions non-cutting method of manufacture. Within one mold or die assembly at least two of such base plates of the mold or die base are further provided with a pre-determined number of prefabricated cylindrical bores or piercings of any suitable non-circular, mainly polygonal cross-section. Each of this bores or piercings is laid out for and suitable of fittingly receiving an interchangeable mold or die insert carrying the individually shaped (negative) mold or die cavity surface for forming the particular article(s) to be manufactured. The mold or die assembly according to the present invention may comprise, as part of the improved standard modular mold or die base, at least one further base plate provided with prefabricated bores or piercings each of them being capable of fittingly receiving and holding an insert that is or includes at least one standardized or individually shaped component part for material injection or material distribution, or for temporary material storing. Said bores or piercings in such further base plate(s) are always arranged in axial arrangement, and are in their shape and number substantially identical with said bores or piercings for receiving the individually shaped mold or die inserts for forming the article(s) in the mold or die plates.

As an improvement of basic importance, any novel pre-fabricated base plate of the improved mold or die base according to the present invention may also be provided with at least one prefabricated, preferably cast-in hollow space or passage suitable for receiving or conducting means for tempering, especially heating or cooling at least one of the inserts fitted into at least one of the bores or piercings. The at least one hollow space or passage is, as a result of the present invention, located in the possible nearest proximity, preferably coaxially around the inner mantle surface of at least one of the insert receiving bores or piercings. The hollow space or passage for the tempering means may be shaped, at least partially, as at least one channel-like annular open groove cut out from or recessed into, during prefabrication, the inner mantle surface of at least one of the bores or piercings. In preferred embodiments of the mold or die assembly according to the invention, said at least one hollow space or passage for the tempering means is provided by at least one open annular spiralling groove that is recessed into the mantle surface of at least one of the bores or piercings. The groove is closed, so as to form a throughfare flow passage for any suitable tempering medium or a housing for a spiralling electric heater etc., by the outer mantle surface of the fittingly held insert.

The mold or die base of the mold or die assembly according to the present invention may also comprise at least one further prefabricated base plate provided with, especially in one of its matching surfaces, at least one channel-like groove or recess for enabling access to the at least one hollow space or passage for the tempering means in the neighbouring, adjacent base plate. Hereby the tempering means conducted by or contained in said hollow space or passage can be fed with any suitable tempering medium or electrical energy from any suitable outside source.

The modular standard mold or die base of the mold or die assembly according to the invention may also comprise at least one prefabricated base plate provided with bores or piercings capable of fittingly receiving inserts with thoroughfare bores or a recess for any standardized or individually designed component part of a knock-out pin assembly for removing the ready made article(s) from at least one of the mold or die halves upon moving the movable mold or die half into its open position. Further prefabricated base plates may serve as cooperating pressure or support plates associated with at least one of the mold or die plates. Such plates are also provided with prefabricated bores or piercings capable of fittingly receiving at least one insert for guiding, embedding or retaining certain component parts, especially the knock-out pins of a knock-out pin assembly for removing the ready-made article(s) from at least one of the mold or die halves when moved into open position. Yet other prefabricated base plates, preferably arranged in pairs as outermost clamping plates adapted respectively to be attached to the bed and movable head of an injection molding press, a die casting machine, a press or the like, can also be provided with suitable centering means. At least optionally, such plates may also be provided with distance shoulders so as to provide a suitable inner space within the mold or die base for receiving at least one of the above mentioned base plates adapted for material distribution and also for housing the component parts, especially pressure or retained plates of the knock-out pin assembly. n all such further base plates mentioned above, the prefabricated bores or piercings for insert reception are arranged in axial alignment and in both shape and number, substantially identical with said bores or piercings for receiving the article forming mold or die inserts in said at least two mold or die plates of the modular standard mold or die base.

It can be readily understood that by applying mold or die bases consisting of ready-to-use prefabricated modula standard base plates provided with the predetermined arrangement of bores or piercings for fittingly receiving said inserts, the latter can always be manufactured, at a minimum of individual machining, from various materials, such material choosen for a particular insert being the most suitable and also most economical for the particular function to be performed. The same applies to the choise of material for the base plates as well. Before completing a particular mold or base assembly, the component parts such as base plates and inserts can be heat treated individually so as to provide optimum life performance. Methods of manufacture can also be choosen accordingly. Since for the most part, high-precisions non-cutting methods can be used for base plate prefabrication, losses and waste of high-quality material are kept to the possible minimum. The achievable high degree of prefabrication allows for programmed, very economical mass production. Heat-treated, especially hardened base plates and inserts of high performance can be shaped by spark erosion. The same applies to the finishing process of the bore or piercing wall surfaces especially when they are of non-circular shape (for mold or die assemblies for the manufacture of elongated articles e.g.). Since the piercings for one particular type or particular types of mold base are of predetermined arrangement and in axial alignment, for spark erosion so called multiple group electrodes fixed to one single movable tool head in exact pre-determined positions with respect of each other can be used for simultaneous working.

By making use of the present invention, qualified design work can also be reduced to a minimum. Design work can be considerably limited to the proper selection of the prefabricated base plates for arriving at proper mold or die bases for a suitable mold or die assembly that would fit best for the particular article(s) to be manufactured.

Further objects and advantages of the present invention will be apparent from the following description, when taken together with the accompanying drawings which illustrate, by way of example, preferred embodiments of the invention which are represented in the various figures as follows.

Figure 17:
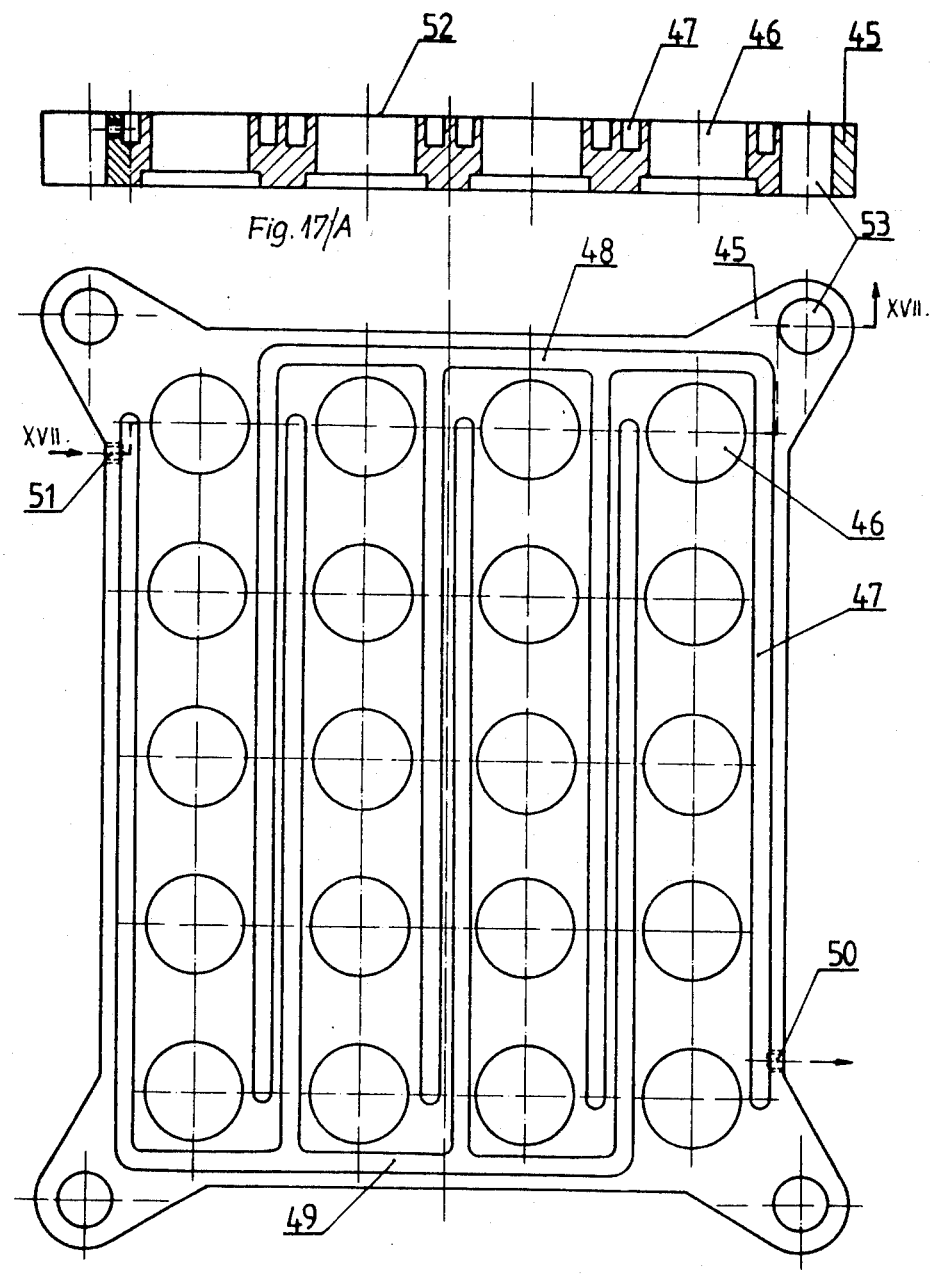
Figure 18:
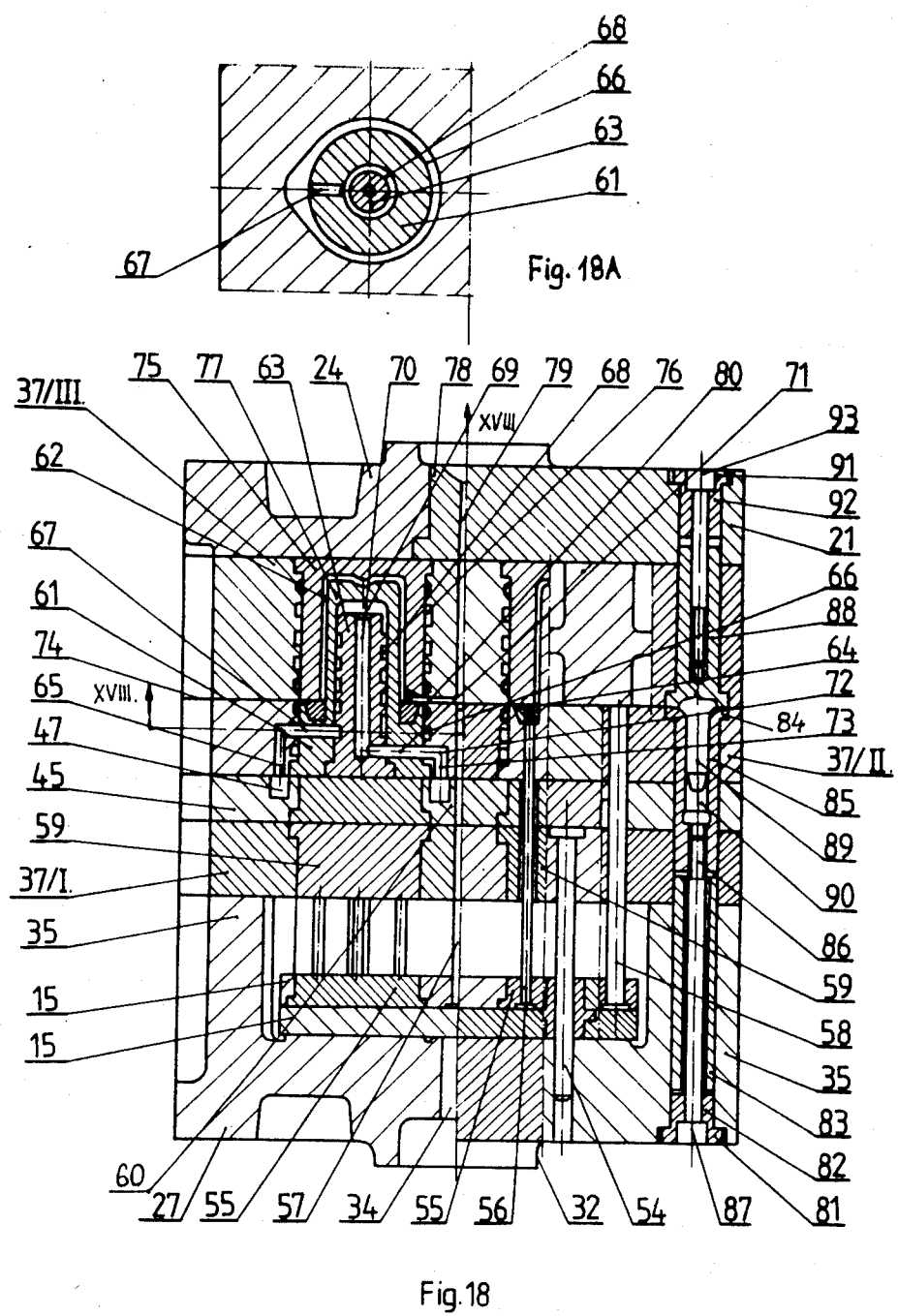
Figure 19:
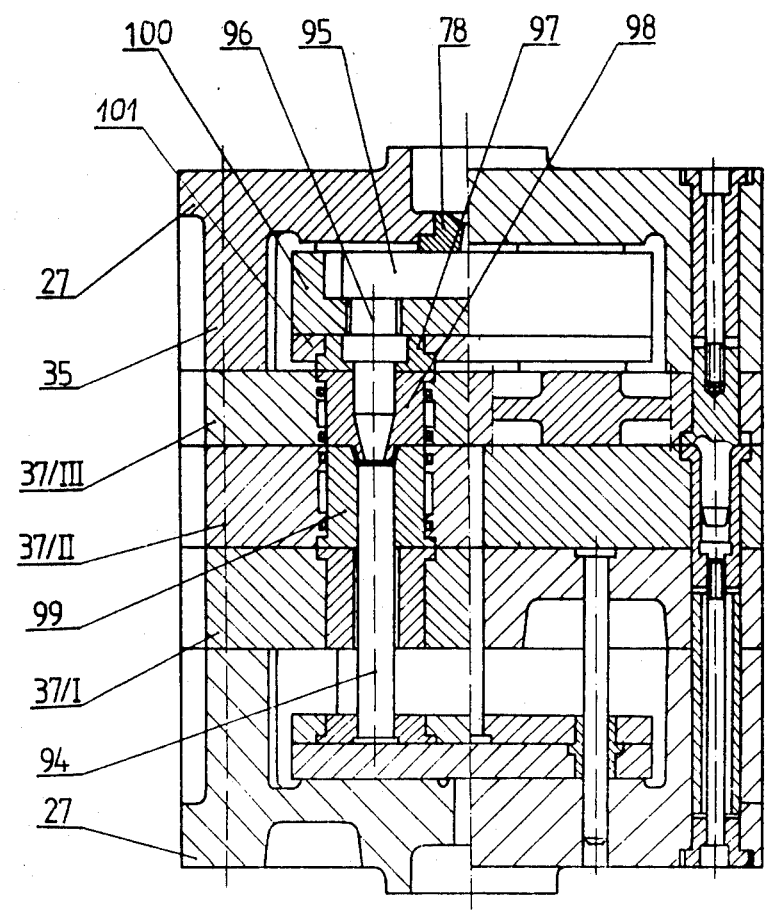

FIGS. 17 and 17/A show, respectively, a top and a cross-sectional view of a further prefabricated base plate, suitable for distributing a tempering medium, for a mold or die base of a mold or die assembly according to the invention;

FIG. 18 shows a cross-sectional representation of a particular embodiment, by way of example only, of an injection mold assembly according to the invention;

FIG. 18/A shows an elevated portion of the mold assembly of FIG. 18 in cross-section taken along line XVIII—XVIII of FIG. 18, and FIG. 19 shows a cross-sectional view of a further embodiment of an injection mold assembly according to the present invention.

Referring to the drawings, FIGS. 18 and 18/A show, by way of example only, a first injection mold assembly for manufacturing a number of cup-like articles of any suitable thermoplastic material. In accordance with the basic idea of the present invention, the mold assembly comprises a mold base that is assembled from repetitive modular elements consisting of "ready to use" interchangeable base plates shown in FIGS. 1 to 17 of the attached drawings. The base plates are prefabricated by high-precision casting and they are, in their peripheral areas, especially in their corner areas, provided with cast-in holes for guide pins, pilot pins, their bushings and screws etc. for guiding and holding together subassemblies of the mold base as it will be described in detail, later. According to the present invention, at least some of the base plates are further provided with finished to size, prefabricated cylindrical bores capable of fittingly receiving and holding interchangeable cylindrical inserts which, e.g. as mold inserts, carry the individually shaped negative mold cavity surface for forming the articles to be manufactured. Within any mold base suitable for mounting together different particular mold assemblies, said bores are arranged in axial alignment and they are in both, shape and number, substantially identical with similar bores of the adjacent matching and co-operating base plates. Besides high-precision casting, such modular standard base plates can also be prefabricated by using any other high-precisious non-cutting method of manufacture, such as galvanoplastics e.g., whereby substantially finished to size prefabricated base plates having only a certain pre-determined grinding allowance within well kept tolerance limits along their respective, substantially parallel matching surfaces are obtained. It is to be emphasized that most of said base plates are, when viewed along their various cross-sections, of varying, non-uniform thickness between their parallel matching surfaces by having full plate thickness in plate areas surrounding or between the finished to size prefabricated bores only, whereby in the base plates areas of full plate thickness serving as insert receiving, guiding, abutting or stiffening projections, together with material and weight-saving recesses therebetween are provided for.

Coming back now to FIG. 18, the injection mold assembly shown therein can be attached to the movable head (not shown) of an injection mold press by means of a clamping plate 27 that forms, according to the invention, a component part of a modular standard mold base comprising prefabricated, cast-steel base plates as it will be appearent from the following detailed description. The clamping plate 27 is in this particular embodiment one of the kind shown in detail in FIGS. 11 and 12 of the attached drawings. It is provided with cast-on distance shoulders 35 along two sides, and it has pre-fabricated bores 30 for receiving certain functional inserts. Its lower matching surface 28 is a continual plane provided with a centering choulder 32 around a central centering hole 34. The inner matching surface shows abutting eyes 29 around four holes 33. Recesses 31 are foreseen for the purpose of material- and weight-saving. Corner holes 36 are capable of fittedly housing fastening bushes 82 and guide bushes 83 at all four corners. Within the inner space provided by the two distance shoulders 35 between the clamping plate 27 and a support plate 37/I there are two knock-out plates 15 of a knock-out pin assembly. The path of possible movement of the knock-out plates 15 is determined by inner guide pins 54. In prefabricated bores of the upper knock-out plate 15 inserts for embedding heads of knock-out pins 56 are fitted. Between the two knock-out plates are further embedded a pin 57 for withdrawing the material inlet nozzle (not shown), and retainer pins of the knock-out assembly. The knock-out pin 56 go through guide holes drilled into inserts 59 that are fitted into prefabricated holes of the support plate 37/I in accordance with the spirit of the invention. Between a mold plate 37/II provided with bores for fittingly holding inserts 61, and the support plate 37/I there is a further base plate provided with bores for inserts having thoroughfare holes for the knock-out pins 56, and also provided with a system of grooves for conducting a suitable tempering medium, e.g. hot oil to the possible nearest proximity of the inserts 61 and thus, to that of the article to be molded. Base plate 45 serving as distributor plate for the tempering medium is shown in FIGS. 17 and 17/A in details. As shown in these drawing figures, corner holes 53 are provided for holding together the base plate 45 in axially aligned and matching adjacent position with the mold plate 37/II, with support plate 37/I and clamping plate 27. A connecting system of parallel grooves 47, connected to each other by means of grooves 49 and 48 in the manner as shown in FIG. 17, provides an inlet passage supplied via inlet hole 51, and an outlet passage via outlet hole 50, respectively, for circulating the tempering medium to and form the nearest proximity of the articles to be manufactured. Prefabricated bores 46 are also here provided for fittingly receiving inserts of different individual functions. A plane matching surface 52 of the base plate 45 facing the adjacent plane matching surface of mold plate 37/II can be treated with a known appropriate sealing compound so as to prevent leakage of the tempering medium. Instead of using an extra prefabricated base plate 45 with a cast in or cut out groove system as shown in FIGS. 17 and 17/I, and described above, such medium distributing grooves can also be recessed directly into at least one of the adjacent matching surfaces of the mold plate 37/II and the support plate 37/I. In such embodiments there is no need to apply a base plate 45 for medium distribution. Such grooves, in fact, can be recessed into any of the prefabricated base plates if it is considered to be necessary or of advantage. Referring now again to FIG. 18, in the prefabricated bores of the mold plate 37/II mold inserts 61 each carrying as a mold cavity 62 the forming surface for an individually designed and shaped article, and housing a cooling core 63 and a knock-out ring 64, are properly fitted. The knock-out rings 64 are connected to threaded end portions of the knock-out pins 56. The tempering medium for setting the plastics material injected into the mold cavity 62 flows from the inlet passage of the grooves 47 of base plate 45 via a hole 65, another groove 66 and a further hole 67 into a spiralling annular groove 68 around the cooling core 63 into a space above the latter, wherefrom it is conducted back via a central hole 70, a connecting hole 71, a groove 72, and a further hole 73 into the groove 47 of base plate 45, said groove 47 being part of the outflow passage for the tempering medium as shown and described further above with reference to FIG. 17. All component parts described so far belong to the movable mold half of the mold assembly. A second mold plate indicated by 37/III in FIG. 18 of the attached drawings belongs already to the other mold half of the mold assembly that is attached via a second clamping plate 21 to the stationary bed of the injection mold press. Thus, the adjacent matching surfaces of mold plates 37/II and 37/III represent the common parting face 74 of the mold assembly along which the latter is opened for ejecting the ready made articles. A mold cavity for the (negative) outer surface shape of the article to be molded is carried by each of inserts 75 that are again fittingly received in and held by prefabricated bores of the mold plate 37/III. Annular spiralling grooves 76 are again recessed into the mantle surfaces of said bores, preferably by prefabrication, for conducting the tempering medium in a similar way as already described above.

In the second clamping plate 21 there is an insert 78 carrying a central hole 79 through which the molten plastics material is injected via a system of material distributing channels 80 into the mold cavities 62. After setting the plastics material injected, the movable mold half is withdrawn whereby the mold assembly is opened along the common parting face 74. During and activated by this movement, a stationary pin (not shown) which extends through the central hole of the clamping plate 27 abuts against the knock-out plates 15. As a result of this, the knock-out rings 64 that are connected via knock-out pins 56 to said knock-out plates, emerge from the backwardly moving surface of the mold plate 37/II whereby the ready made articles are removed from the inner mold cavity surface 77. Following this the mold halves are closed again. For this purpose, the moveble mold half is brought into closed position against the other, stationary mold half. While performing this, the knock-out plates 15 are pushed back, together with the knock-out rings 64 and knock-out pins 56, by means of retainer pins 58 into their withdrawn, backward position. A central pin 57 has the task of keeping clean the conical central hole 79 by removing solid rests of the injected plastics material from the latter when the mold halves are opened for article removal.

The base plates constituting the mold halves and thus, the mold base are to be held together and guided with respect of each other, respectively, by means of component parts which are supposed to be familiar to those skilled in the art. In the particular embodiment of a mold assembly shown in FIGS. 18 and 18/A such component parts are as follows: A fastening bush 82 having a shoulder 81, and a guide bush 83 are fittingly inserted into each of corner holes 36 of the clamping plate 27. The ends of the guide bushes 83 extend into axially aligned corner holes of the support plate 37/I. From the opposite direction, a fastening bush 85 having an annular shoulder 84 is fittingly inserted into each of coaxially aligned corner holes of the mold plate 37/II. The fastening bushes 85 go through matching corner holes of the base plate 45 and their ends extend, at least partially, into the corner holes of the support plate 37/I. The threaded end portion 86 of a thoroughfare central hole in the fastening bush 85 is receiving the threaded end of a screw 87 whereby the mold plate 37/II, the base plate 45, the support plate 37/I and the clamping plate 27 are rigidly secured and clamped together. The upper portion 90 of the thoroughfare central hole in the fastening bush 85 serves for the purpose of fittingly guiding a pilot pin 89 that is integral part of a guide bush 88. Four such guide bushes 88 are fittedly inserted into corner holes of the mold plate 37/III, and their ends extend into identical corner holes of the second support plate 21 that is attached to the stationary bed of the injection molding press. From the opposite direction again, fastening bushes 92 each having an annular shoulder 91 are fitted into all four corner holes of the support plate 21. Screws 93 cooperating with their threaded end portions with similarly threated inner hole portions of the guide bushes 88 are clamping and securing the mold plate 37/III to the clamping plate 21 whereby a substantially integral stationary mold half is provided. Centering shoulders 32 and 24 ensure, respectively, a proper relationship between clamping plates 21 and 27 and their receiving parts, i.e. stationary bed and the movable head of the molding press.

FIG. 19 shows, by way of example only, a further embodiment of an injection mold assembly according to the present invention having a mold base assembled from repetitive modular standard elements consisting of substantially "ready to use" interchangeable base plates. The embodiment of FIG. 19 is provided with a so called hot runner system for material distribution as will be appearant from the following description. Here, the movable mold half is assembled from a clamping plate 27, a support plate 37/I and a mold plate 37/II. On the other hand, the stationary mold half consists of an identical support plate 27 provided with distance shoulders 35. To this second support plate is rigidly secured the second, stationary mold plate 37/III. The fastening and guiding component parts and their arrangement are fully identical with what has been already shown and described further above in connection with FIG. 18. While also the knock-out pin assembly, including here knock-out pins 94, is very similar to that of the formerly described embodiment of FIGS. 18 and 18/a, here a different structure is used for material inlet and distribution.

The plastics material is injected through a nozzle that is carried by an insert 78 for material inlet fitted into a prefabricated central bore of the stationary clamping plate 27, into a hot runner insert 95 which is fittingly held by a prefabricated standard base plate 100 serving as hot runner plate for material distribution. By means of a thread a material inlet nozzle 96 is attached to the hot runner insert 95 for each mold cavity. Said material inlet nozzles 96 are fitting with further inserts 97 that are located and held in prefabricated bores of lower hot runner plate 101 and in inserts 98 of the stationary mold plate 37/III. Thus, the material is injected through passages of the hot runner insert 95, and through the connecting inlet nozzles 96 directly and without losses into the mold cavities that are formed by mold inserts 97 and 98 respectively. The base plates 100 and 101 of the hot runner material distribution system are located in an inner hollow space within the mold base that is provided by the distance shoulders 35 of the stationary clamping plate 27. Further functional component parts of the embodiment of FIG. 19 are very similar if not fully identical to those of the embodiment of FIGS. 18 and 18/A.

Figure 2:
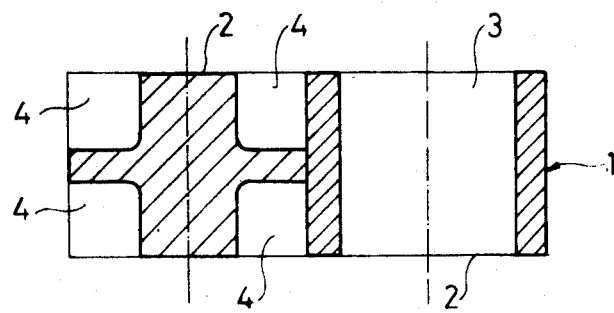
FIG. 2 shows a cross-section of the base plate of FIG. 1 taken along line II—II in FIG. 1.
Figure 1:
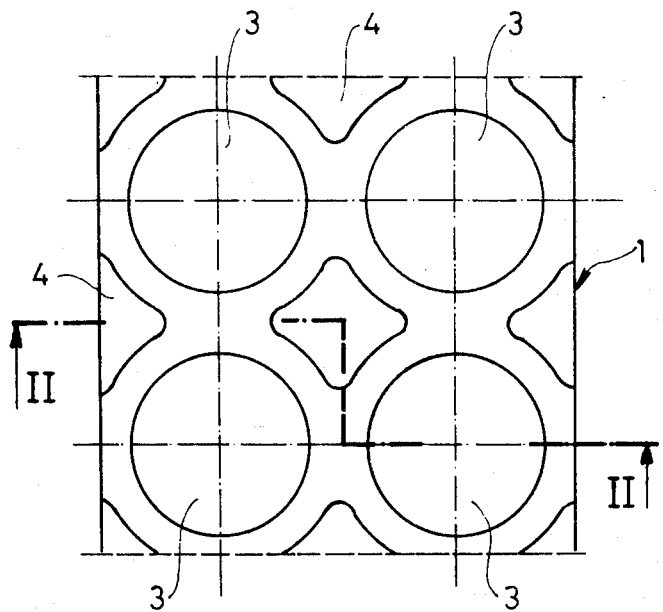
FIG. 1 shows a plan view of a portion of a base plate, prefabricated by high-precision casting with cylindrical bores for receiving mold or die inserts.
Figure 3:
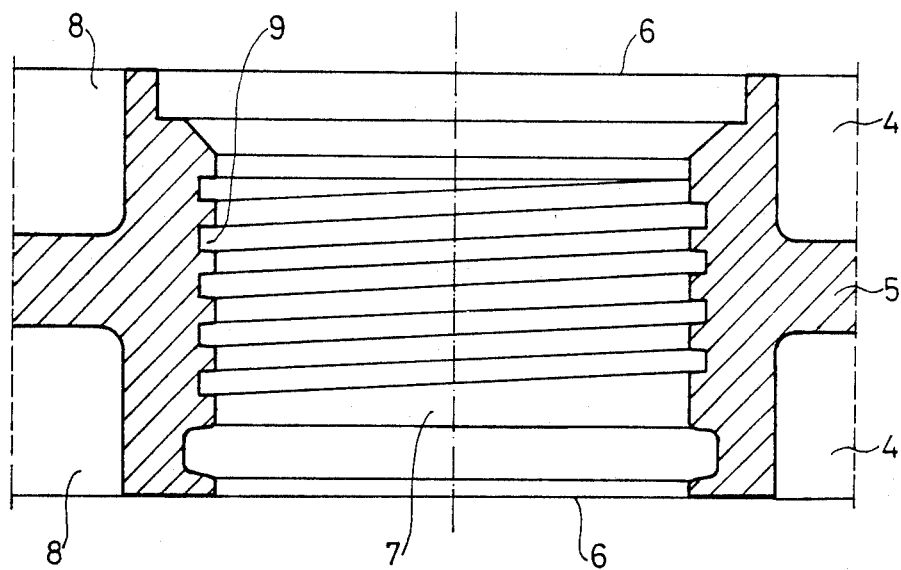
FIG. 3 shows an enlarged cross-sectional representation of a portion of a base plate indicating a preferred embodiment for providing sufficient tempering of an insert when the letter is fitted into its prefabricated receiving bore.
Figures 4, 5, 6:
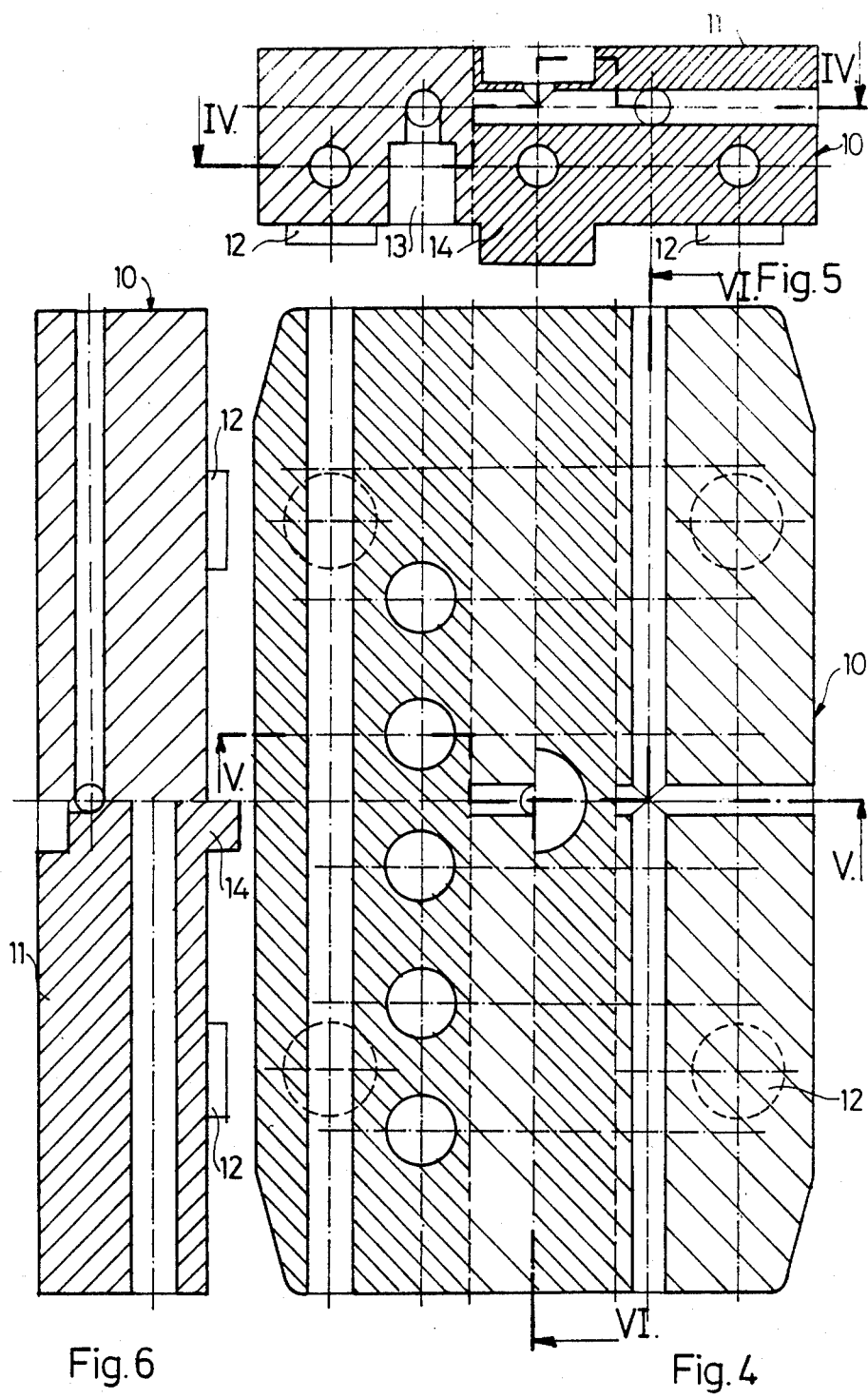
FIGS. 4 to 6 show various cross-sections of a further prefabricated base plate serving as a material distributing plate with a hot runner groove and bore system for a 12-core mold assembly.
Figures 7, 8:
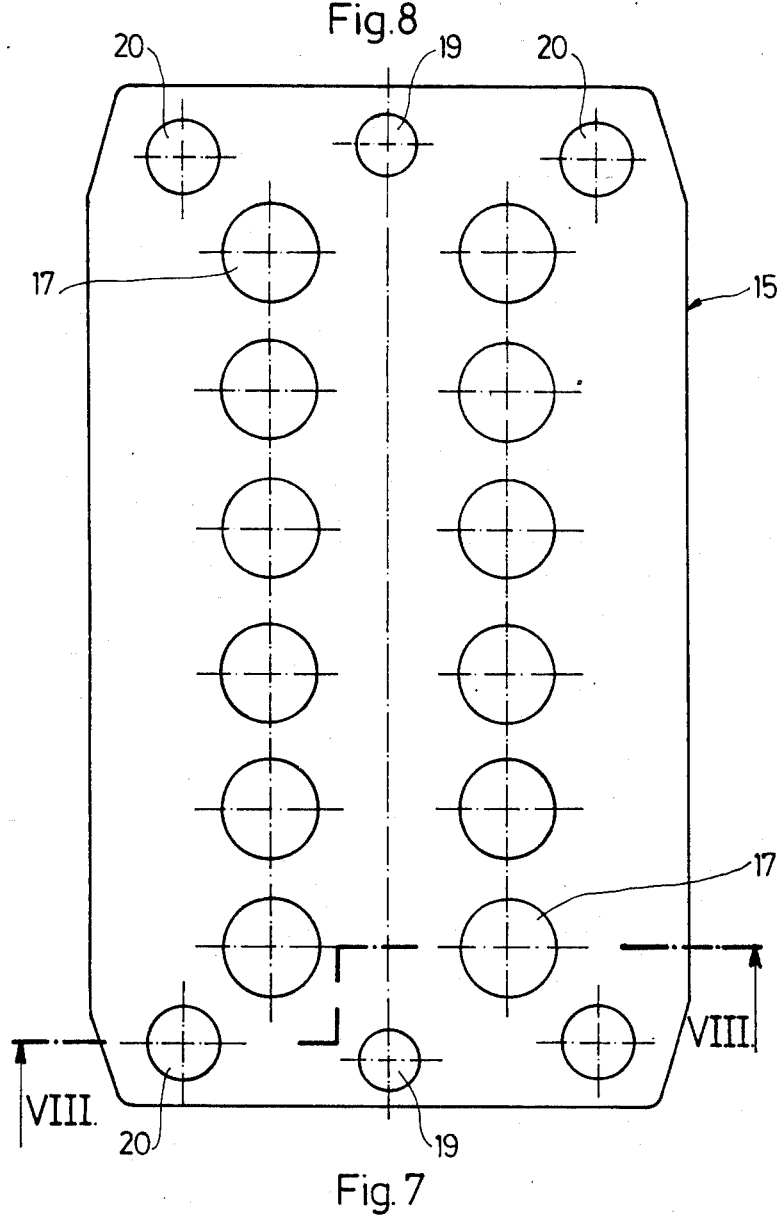
FIG. 7 shows a plan view of a further prefabricated base plate with cast-in bores for receiving inserts that are parts of the knock-ut pin assembly of the same 12-core mold assembly.
FIG. 8 shows a cross-section of the base plate of FIG. 7 taken along line VIII—VIII.
Figures 9, 10:
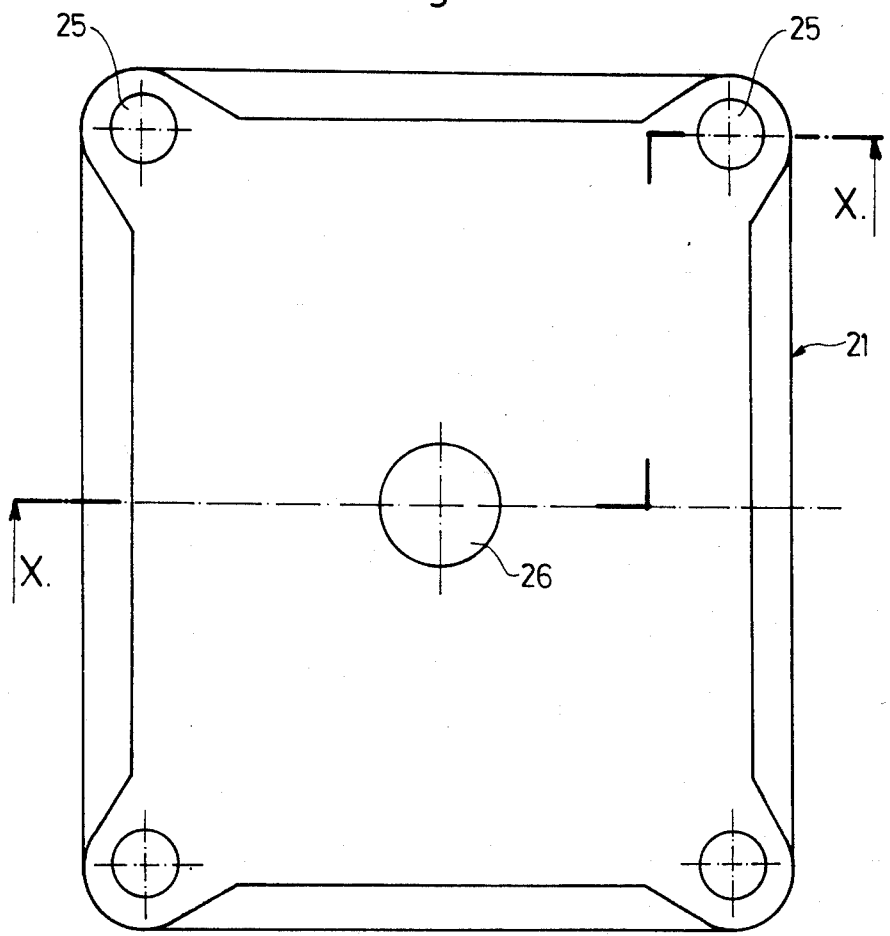
FIG. 9 shows a plan view of a further prefabricated base plate capable of serving as a clamping plate for a mold or die base of a mold or die assembly according to the invention.
FIG. 10 show a cross-section of the clamping plate of FIG. 9 taken along line X—X as indicated in FIG. 9.
Figure 12:
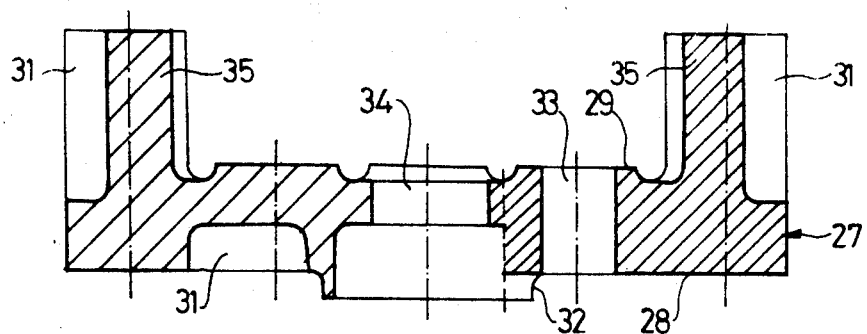
FIGS. 11 and 12 show, respectively, a plan view and a cross-sectional view taken along line XII—XII of FIG. 11 of a further prefabricated base plate with integrated cast-on distance shoulders for a mold or die base of a mold or die assembly according to the invention.
Figure 11:
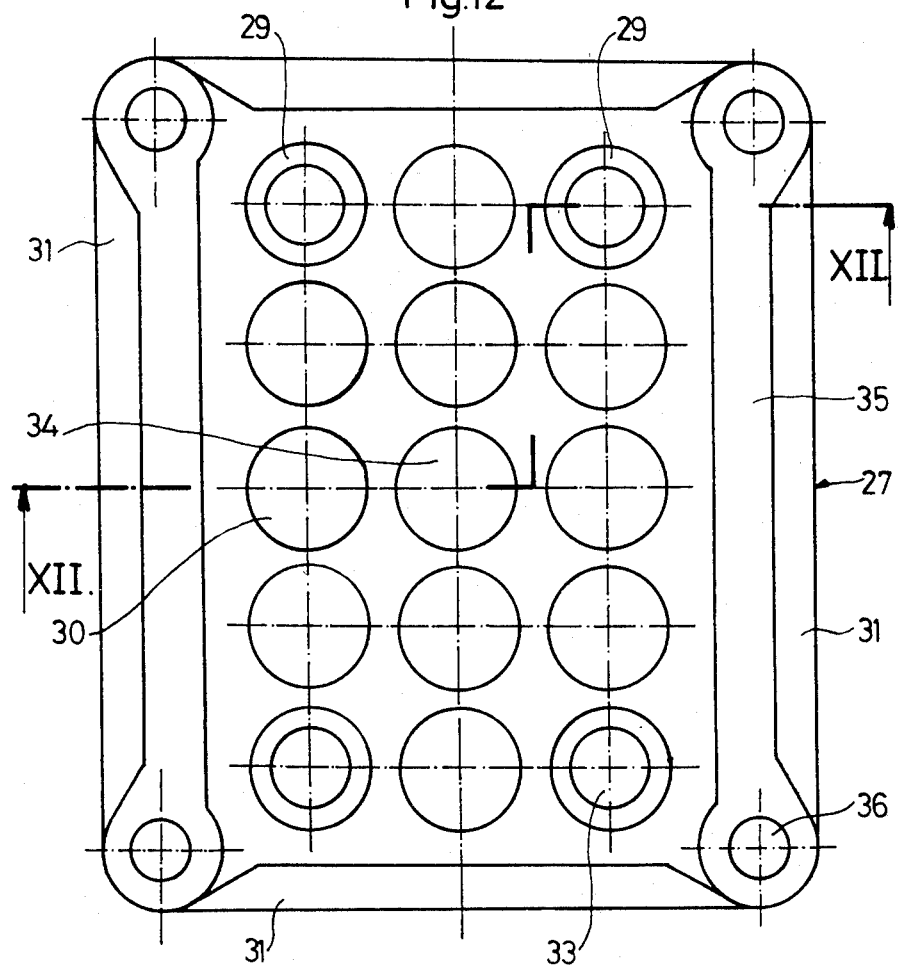
Figure 14:
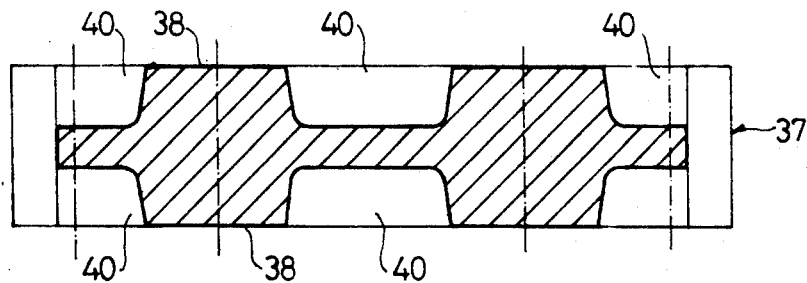
FIGS. 13 and 14 show, respectively, a plan view and a cross-section taken along line XIV—XIV of FIG. 13, of a prefabricated base plate suitable for serving as a mold or die plate in a mold or die base of a mold or die assembly according to the invention.
Figure 13:
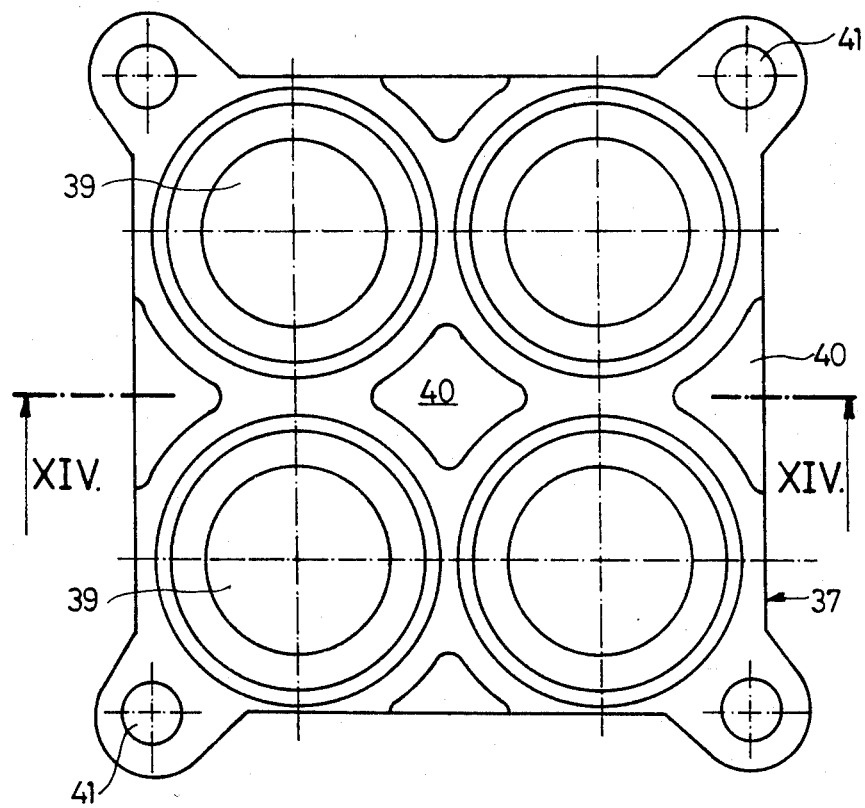

FIGS. 1 and 2 show an elevated portion of a base plate 1 for a mold assembly according to the invention indicating that the prefabricated, high-preciously cast base plates 1 have material- and weight-saving recesses 4 between areas of full plate thickness around prefabricated bores 3 whereby maching surfaces 2 of limited areas are provided. FIG. 3 shows an elevated cross-section across a prefabricated i.e. precast bore 7 in a base plate 5 having parallel matching surfaces 6 and material-saving recesses 4 and 8. Here, a groove 9 is provided in the inner wall surface of the bore 7. The groove 9 forms spiralling annular channel or passage for a means for tempering the insert that can be fitted into the bore 7. Such a spiralling passage may serve as housing for an electric heater or as a flow conduit for any suitable tempering agent. It can clearly be seen that the means for tempering is placed in the possible nearest proximity of the insert to be heated or cooled whereby very good an homogenous heat transfer and distribution are achieved. FIGS. 4 to 6 show, by way of example only, a hot runner system for a 12-core mold or die assembly which is worked out, by drilling, in a base plate 10. The base plate has a plane ground maching surface 11 on its upper side, prefabricated abutting eyes 12 on its lower side, and also prefabricated bores 13 for receiving material inlet nozzles as fitted inserts. A centering shoulder 14 provides for the exact location of base plate 10 within a mold base. The base plate 10 is also provided with drilled holes for a tempering agent flowing therethrough whereby a setting of the molten plastics agent within such hot runner system can successfully be prevented. FIGS. 7 and 8 show a further, very often usable prefabricated base plate 15 which is laid out for a 12-core mold assembly serving as a knock-out pin plate as described further above in connection with the embodiment of FIGS. 18 and 18/A. The knock out pin plate 15 has parallel matching surfaces 16. As it can clearly be seen, in certain areas the full plate thickness is considerably reduced by the provision of material—and weight-saving recesses 18. The base plate 15 is provided with cast-in prefabricated bores 17 for receiving functional inserts and also with peripheral holes 19 and 20 capable of receiving guide bushes or fastening bushes for screws, guide pins etc. that are parts of the knock-out pin assembly of a standard modular mold or die base. FIGS. 9 and 10 show partly in plan view, partly in cross-section a base plate according to the invention which is laid out for serving as a clamping plate 21 for a mold or die base. The clamping plate 21 has ground parallel matching surfaces 22 that are, in a material saving manner, indented by recesses 23. A central hole 26 enables for the central material inlet nozzle of an injection mold press or a die casting machine (not shown) to go therethrough inside the mold base. Corner holes 25 are provided for receiving the necessary fastening and guiding elements of a mold or die base in accordance with what was duly dealt with reference to FIG. 18. Another base plate capable of serving as another type of clamping plate 27 for a mold or die assembly is shown in FIGS. 11 and 12 and was dealt with in detail further above. Another prefabricated, pre-cast base plate 37 shown in FIGS. 13 and 14 is suitable for using it as a mold or die plate in a four-core mold or die assembly according to the present invention. Material-saving recesses 40 worked into parallel matching surfaces 38 result in a relatively low weight despite of sufficient strength and rigidity. The prefabricated bores 39 are suitable for fittedly receiving mold or die inserts for forming the article and they are provided with annular spiralling grooves for a suitable tempering means as shown in FIG. 3 in detail. Corner holes 41 are provided for fittingly receiving fastening and guide bushes for guiding and/or clamping together the several component parts of the modular standard mold or die base.

Figures 15, 16:
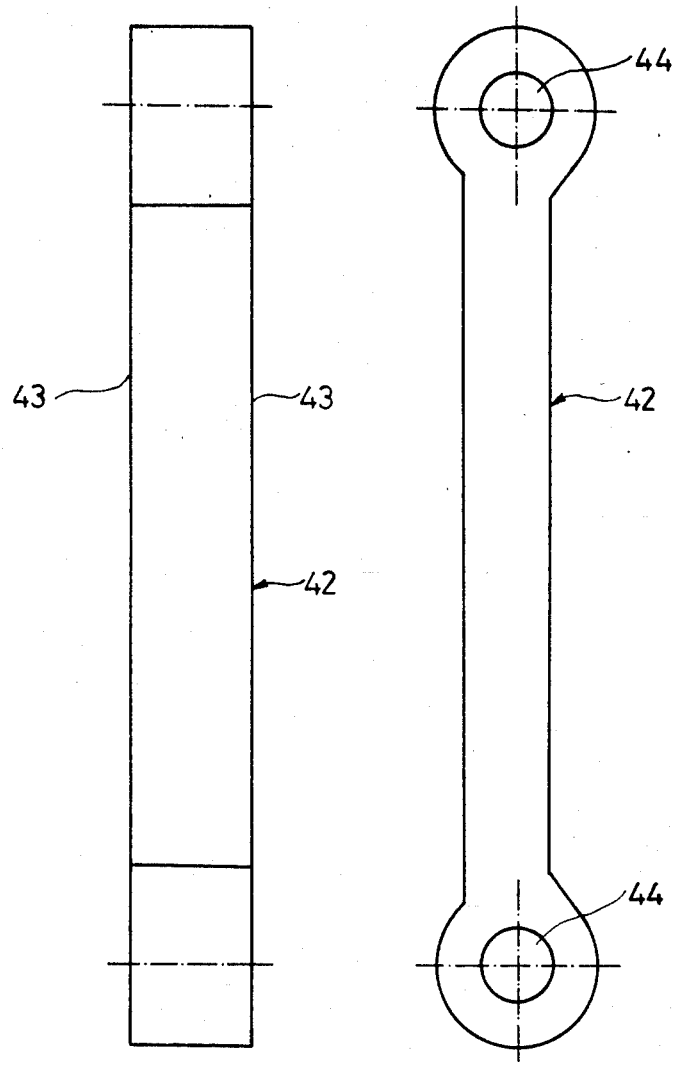
FIGS. 15 and 16 show, respectively, a top and side view of a prefabricated distance plate or distance member for a mold or die base of a mold or die assembly.

Finally, a kit of prefabricated mold or die base plates may also contain distance pieces 42 as they are shown, by way of example only, in FIGS. 15 and 16. Such distance pieces with parallel matching surfaces 42 and with prefabricated corner holes 44 may provide enlarged inner hollow spaces within a mold or die base for various functional component parts and assemblies.

What is claimed is as follows:

1. A mold or die assembly for manufacturing articles, said mold or die assembly comprising at least two cooperative halves adapted respectively to be fixedly attached to a bed and a movable head of a forming machine where the movable half can be pushed closed against a fixed half while forming the article, and can be withdrawn open again so that the formed article can be removed, said mold or die assembly comprising fastening and guide means for securing together respective component parts of the assembly and for guiding the halves against each other, the improvement in combination therewith comprising said mold or die base assembly being formed of repetitive modular standard elements consisting of "ready to use" interchangeable prefabricated and prehardened base plates, said prefabricated and prehardened base plates being provided, in their peripheral areas, with predetermined and prefabricated holes for receiving the fastening and guide means for guiding and holding together subassemblies of said mold or die assembly, said plates being prefabricated by a high precision noncutting method of manufacture, said base plates being hardened by a suitable tempering process during prefabrication, and at least two of said plates defining plural apertures of non-circular cross-section for receiving cavity-defining mold elements and surfaces defining said apertures also defining grooves for receiving heat transfer means therein said grooves being generally transverse to a central axis of said apertures each of said apertures being formed by said non-cutting method of manufacture and being preformed to be sized and shaped according to the size and shape of the article to be manufactured each of said mold elements being interchangeable and each carrying an individually shaped forming surface for use in forming an article.

2. A mold or die assembly as claimed in claim 1 further comprising at least one further base plate provided with apertures each of them being capable of fittingly receiving and holding an insert that includes at least one standardized shaped component part for accommodating and conducting molding material, said apertures said further base plate being arranged in axial alignment, and being in both shape and number substantially identical with the apertures of the other base plates for receiving said insert for forming the article in said mold or die plate assembly.

3. A mold or die assembly as claimed in claim 2 wherein at least one of said base plates is provided with at least one groove suitable for accommodating means for tempering the insert fitted into said apertures, said at least one groove being located in proximity with said apertures.

4. A mold or die assembly as claimed in claim 3 wherein said apertures for said tempering means is shaped to include at least one channel-like annular open groove in each surface adjacent to said apertures.

5. A mold or die assembly as claimed in claim 3 wherein said passage for said tempering means includes at least one open annular spiralling groove that is recessed into each surface adjacent to said apertures, said spiral groove being closed, so as to form a throughfare groove.

6. A mold or die assembly as claimed in claim 5 further including at least one additional prefabricated base plate provided with at least one channel-like recess for enabling access to a thoroughfare passage on an adjacent base plate.

7. A mold or die assembly as claimed in claim 1 further comprising at least one further prefabricated prehardened base plate provided with apertures, each of the apertures in said further base plate being capable of fittingly receiving an insert with thoroughfare bores for any component part of a knock-out pin assembly for removing the articles from at least one of said halves when moving the movable half into its open position, said apertures in said further base plate being arranged in axial alignment, and being in both shape and number substantially identical with said apertures of the other base plates for receiving said inserts for forming the article.

8. A mold or die assembly as claimed in claim 1 further comprising at least one further prefabricated prehardened base plate serving as a support plate to said base plates, said further base plate being provided with prefabricated apertures, said apertures in said support base plate being arranged in axial alignment, and being in both shape and number, substantially identical with said apertures of the other base plates for receiving said inserts for forming the article.

9. A mold or die assembly as claimed in claim 1 further including two further prefabricated prehardened base plates arranged as outermost clamping plates and being provided with centering means.

10. A mold or die assembly as claimed in claim 1 wherein said prefabricated prehardened base plates have, when viewed along their various cross-sections, a non-uniform thickness between their matching surfaces.

11. A mold or die assembly for manufacturing articles, said mold or die assembly comprising at least two cooperative halves adapted respectively to be attached to a bed and to a moveable head of a forming machine where a movable half can be pushed closed against a stationary half while forming the article, and can be withdrawn open again so that the formed article can be removed, said mold or die assembly comprising fastening and guide means for securing together respective component parts of the assembly and for guiding the movable half against the stationary half, the improvement in combination therewith comprising said mold or die assembly being formed of repetitive modular standard elements consisting of a plurality of "ready to use" interchangeable prefabricated and prehardened base plates, said prefabricated and prehardened base plates being provided, in their peripheral areas, with predetermined and prefabricated holes for receiving the fastening and guide means for guiding and holding together subassemblies of said mold or die assembly, said base plates being prefabricated by a high precision non-cutting method of manufacture, said base plates being hardened by a suitable tempering process during pre-fabrication, each of said plurality of base plates being further provided with a number of finished to size, prefabricated bores or non-circular piercings, each of said bores or non-circular piercings being formed by said non-cutting method of manufacture and being preformed to be sized and shaped according to the size and shape of the article to be manufactured, and each of said bores or non-circular piercings being adapted to fittingly receive an interchangeable insert carrying an individually shaping surface which is usable in forming an article to be manufactured, and at least one of said plurality of prefabricated and prehardened base plates having the bores or non-circular piercings thereof adapted to fittingly receive and hold an insert that includes at least one standardized shaped component part for accommodating and conducting molding material, and another of said plurality of prefabricated and prehardened base plates having the bores or non-circular piercings thereof being adapted to fittingly receive another insert with thoroughfare bores for accommodating a component part of a knock-out pin assembly for removing the articles from at least one of said halves when moving the movable half into its open position, still another one of said plurality of base plates being a support base plate and serving as a support plate to said plurality of base plates, said bores or non-circular piercings of each of said plurality of base plates being arranged to be in axial alignment with the bores or non-circular piercings of the other base plates when all of the base plates are in position on said mold or die assembly, and being in both shape and number substantially identical with said bores or non-circular piercings of the other base plates for receiving said inserts for forming the article in said mold or die plate assembly, each of said plurality of base plates having when viewed along its various cross-sections, a non-uniform thickness between matching surfaces.

* * * * *